Aug. 11, 1936.  B. GROB  2,050,490
OPEN END BAND SAW
Filed Jan. 19, 1935

INVENTOR
BENJAMIN GROB
BY
Fred G Parsons
ATTORNEY

Patented Aug. 11, 1936

2,050,490

UNITED STATES PATENT OFFICE 2,050,490

OPEN END BAND SAW

Benjamin Grob, West Allis, Wis., assignor to Grob Brothers, West Allis, Wis., a partnership composed of Benjamin Grob and Theodore Grob Application January 19, 1935, Serial No. 2,529

16 Claims. (Cl. 29—68)

This invention relates to band saws, and more particularly to a machine of that type which is adapted for sawing of metal to effect a desired shape or form.

A purpose of the invention is to provide a band saw which is adapted to be used for sawing out internal portions of work pieces, such as die blocks, etc., where the saw, in order to be operative, must be threaded through the work piece.

Another purpose is to provide such a machine in which the threading of the saw through holes in a work piece may be performed in a minimum of operator's time, and the machine may then be operated for sawing without the necessity of joining or fastening one end of the saw to the other.

A further purpose is to provide a band saw machine which is conveniently and efficiently operative either for internal or external sawing operations without the necessity of joining the two ends of the saw together.

Another purpose is to provide a machine such as mentioned above which has substantially all of the operating convenience and efficiency, both for inside and outside sawing, of a machine which uses a continuous endless band saw, yet permits the saw at any time to be threaded through or removed from a hole in a work piece without effecting or disconnecting joint or connection together of the ends of the saw.

A further purpose is to provide a sawing machine, such as previously referred to, which is particularly adapted for sawing out predetermined forms in the manufacture of metal die blocks, punches, stripper plates, and similar operations.

A further purpose is to provide a machine having a reciprocating flexible saw blade and of such structure that during the reverse movement of the saw the work piece can be separated from the saw, whereby to avoid the serious objections incidental to the saw contacting the work piece during reverse movement.

A further purpose is to provide a machine having a structure and control mechanism adapted for one or more of the purposes previously mentioned, and of generally improved and simplified form as to the construction or operation thereof.

In the drawing.

Like parts are designated by the same reference characters throughout the several views.

Figure 1:
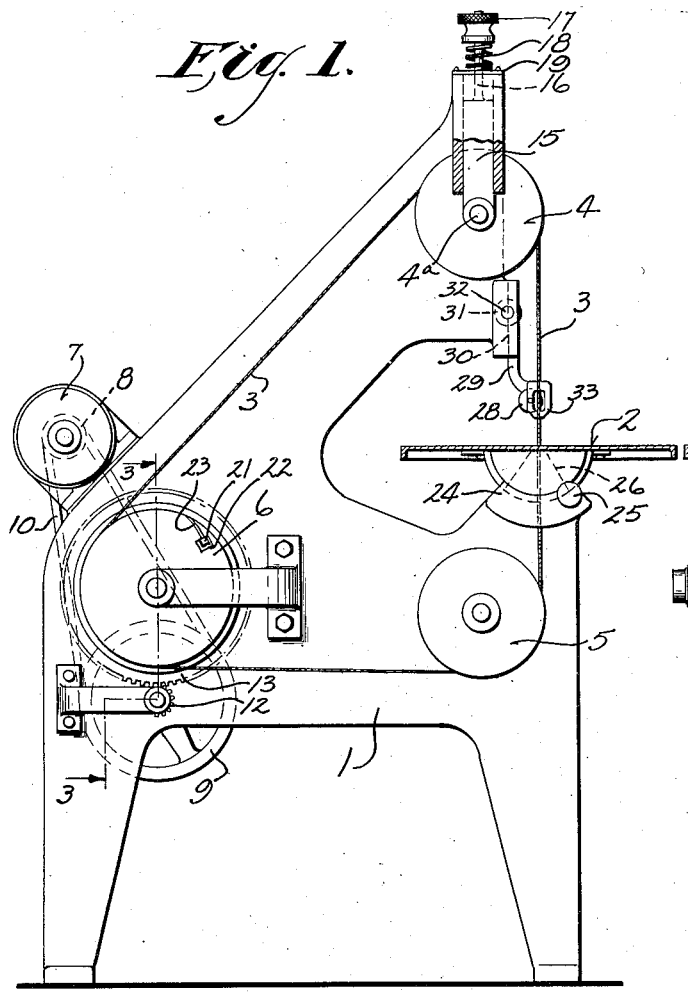
Figure 1 shows a front elevation of a machine incorporating the invention.

The machine includes a main frame or supporting structure 1, a work table 2, a band saw 3, guide rollers or pulleys 4 and 5, which help to maintain the active portion of the saw in a predetermined position relative to the table 2, and a drum or spool 6, which drives the saw and upon which the saw is wound and unwound as the sawing operation progresses. A motor 7, drives the spool 6 through the pulleys 8 and 9 connected by a belt 10, a shaft 11, a reversing and motion interrupting device generally denoted by the numeral 100, an elongated pinion 12, and a gear 13, which is fixed to the spool.

The reversing and interrupting mechanism 100 includes a bevel gear 101 fixed on shaft 11, a bevel gear 102 journaled in housing 1 and having a suitable axial bore in which the extended end of pinion 12 is journaled, an intermediate bevel gear 103, and a clutch member 104 slidably splined on the pinion end and provided with clutch teeth on its opposite ends respectively engageable with complementary clutch teeth on the end faces of the bevel gears 101, 102. The clutch member 104 may be manually shifted to either engaged position to operate the drum in either direction, or to an intermediate disengaged position to stop the drum, by the means of a hand lever 105 fixed on a shaft 106 having an eccentric portion 107 extended into the annular groove shown in the clutch member.

Figure 2:
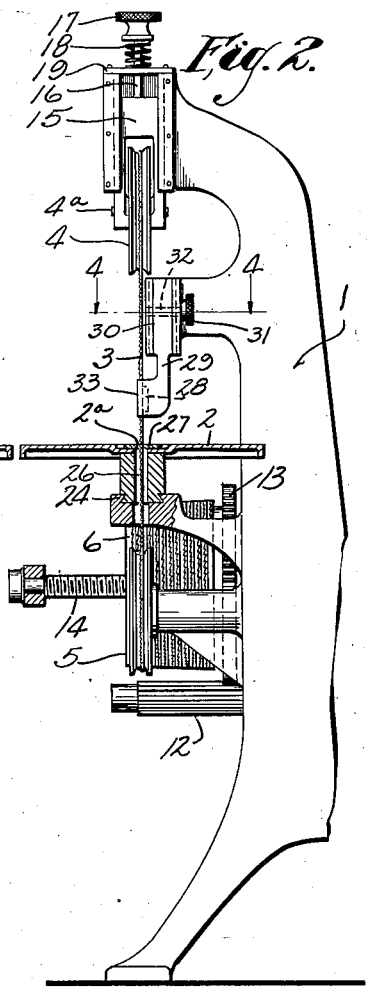
Figure 2 shows a partial side elevation of the same machine, a portion of the housing or framework being broken away.

The saw 3 is wound helically on the spool 6 as shown in Fig. 2, one loop of the saw being extended or carried out over the pulleys 4 and 5, as shown in Fig. 1 to provide a sawing portion near the table. When thus arranged, a rotation of spool 6 causes a linear movement of the saw adjacent to the table 2, and also a simultaneous rolling up of that portion of the saw at the one end of the extended loop and unrolling of the saw at the other end. Since the ends of the loop roll up and unroll at substantially corresponding points axially of the spool, the extended loop of the saw is maintained at substantially or identically the same length and tension at all times.

The spool travels axially at a rate which maintains the ends of the extended loop in alignment with the guide pulleys 4 and 5. For this purpose the drum is mounted on a threaded rod 14 fixed with the frame 1 and is provided with an internal threaded portion or nut 14a engaging the shaft and fixed with the drum. The threads of the shaft 14 are of such pitch or lead that one revolution of the spool will move the spool axially a sufficient distance to provide space for the widest saw which is intended to be used with the machine. In the drawing the saw is shown proportionately much wider than would normally be used, merely for clarity. In practice the saw is relatively much narrower, and a much larger number of turns are wound on the spool.

Figure 3:
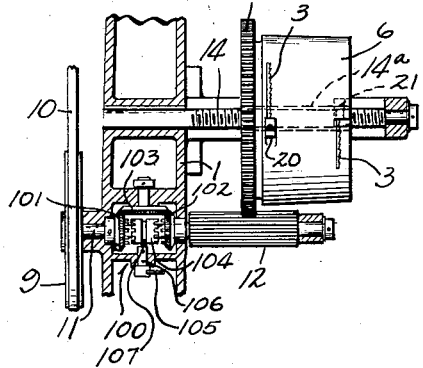
Figure 3 is a partial section taken along line 3—3 of Fig. 1.

The spool 6, as is more particularly shown in Fig. 3, is provided with a slight conical taper with the small end of the spool in the axial direction in which the saw teeth extend. This is done in order that the saw may lie substantially flat, in spite of the side set on the saw teeth.

In order to assist in providing a tension on the looped saw, the upper pulley 4 is pivoted at 4a in a slidably guided member 15, having an upwardly extended portion 16 upon which is threaded a hand nut 17. A spring 18 normally urges the pulley and its carrier 15 upwardly, a thrust plate 19 being provided for the lower end of the spring. The spring is sufficiently short so that the pressure can be released to loosen the saw by unscrewing the hand nut 17. This is desirable for purposes which will be later pointed out.

The two ends of the saw are fixed with the spool 6 by any suitable means. In this instance, the one end of the saw is clamped against the spool by a clamp block 20, and the other end of the saw is provided with an enlarged end portion 21, which may be inserted into a recess 22, the end portion of the saw being received into a channel or groove 23. By the means of this construction, when the hand nut 17 is loosened to loosen the saw, the end of the saw can be removed or inserted in the recess. As the nut 17 is tightened again the tension on the saw is reestablished. In the drawing the size of the end portion 21 is, for clearness, shown considerably exaggerated over that which normally would be used, this enlargement being, in practice, only sufficient to prevent the saw pulling lengthwise out of the slot 23, and being sufficiently small to pass through small holes in the work piece, and the relatively small slot 2a in the table.

Figure 4:
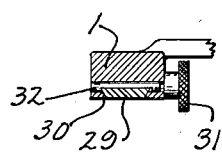
Figure 4 is a partial section on an enlarged scale taken along line 4—4 of Fig. 2.

The table 2 is guided and supported for tilting movement in ways or guides 24, and can be rigidly clamped in any position of such movement by the means of a hand clamp 25, which may be of any suitable form for the purpose, as for instance similar to the clamp shown in Fig. 4.

The saw passes through a slot 26 in the table, there being a hardened insert 27, also slotted for passage therethrough of the saw, and against which the back edge of the saw slides or rides during the sawing operation. Another pressure support for the saw is provided by the means of a pivoted roller 28 carried on a bracket or arm 29 vertically adjustable in a slide or guideway 30, and which can be clamped by a hand nut 31 threaded on a clamp bolt 32 as best shown in Fig. 4, or by any other suitable means. With the structure as shown, the back support roller 28 may be brought as close to the table 2 as the thickness of the work piece will permit. The bracket 29 likewise carries the slotted guide 33 slidably fitted to the sides of the saw to prevent sidewise movement thereof.

In the operation of the machine, where a piece is to be finished which requires that the saw be inserted through a hole in the work piece, the drum drive is operated to bring the spool axially to its extreme right hand position in Fig. 2. Following this the hand nut 17 is loosened, the end 21 of the saw is manually released from the spool 6 and brought back and unthreaded from the table. It is then threaded through the work piece and table, replaced on the roller 5 and again wrapped around the spool and inserted in the slot 23 for engagement of the end 21 in the recess 22. The hand nut 17 is then tightened to reestablish the tension.

During the subsequent sawing operation, when the spool has travelled axially through its complete movement to the left in Fig. 2, whereby there is no more length of saw available, the operator then reverses the movement of the spool by means of the reverser 100, the reverse movement being continued until the drum has again arrived at its right hand axial position in Fig. 2, and substantially all of the length of the saw is again available for sawing. Proceeding in this way, any amount of sawing can be done on the work piece, whether internally or externally thereof, by a series of saw cuts each of which utilize substantially the complete length of the saw blade. The time lost in returning the saw between the sawing operations is relatively small and the sawing operation is much more convenient and efficient than if it were necessary to braze, weld, solder or otherwise join the ends of the saw together, particularly if this had to be done each time the saw was threaded into or removed from a hole in a work piece.

It will be understood that the construction here disclosed is only one of a variety of equivalent forms in which the invention might be incorporated, and that patent protection is desired for each of these forms, if within the spirit and scope of the invention as claimed herein.

What is claimed is:

1. In a sawing machine, the combination of a work support, a flexible band saw having open ends, guides for restraining a relatively short portion of said saw to a predetermined path adjacent said work support, and drive means for said saw including means for passing the other portions of said saw through said path and coiling the saw in a plurality of adjacent coils, and reversing means operable to alternatively effect a reverse direction of saw movement.

2. In a sawing machine, the combination of a work support, a flexible band saw having open ends, guides for restraining a relatively short portion of said saw to a predetermined path adjacent said work support, and means for passing the other portions of said saw successively through said path and coiling the saw in a plurality of adjacent coils including a spool, one of the ends of said saw being fixed with said spool.

3. In a sawing machine, the combination of a work support, a long flexible band saw having open ends, guides for restraining a relatively short portion of said saw to a predetermined path adjacent said work support, means for coiling other portions of said saw in relatively small space in a plurality of loops, drive means for said saw adapted to uncoil said other portion and to unidirectionally pass said other portions through said path, and reversing means operable for alternatively effecting a reverse direction for recoiling said other portions.

4. In a sawing machine, the combination of a base, a work support and a laterally flexible band saw each carried by said base, guides carried by said base for restraining a portion of said saw to a predetermined path adjacent said work support, a rotary spool carried by said base, said saw having an end portion detachably fixed with said spool, and means for simultaneously rotating said spool and moving it axially whereby to wrap said saw helically around the spool periphery.

5. In a sawing machine, the combination of a base, a work support and a laterally flexible band saw each carried by said base, guides carried by said base for restraining a portion of said saw to a predetermined path adjacent said work support, a rotary spool carried by said base, said saw having an end portion detachably fixed with said spool, and power means for simultaneously rotating said spool and moving it axially a predetermined distance for each revolution thereof.

6. In a sawing machine, the combination of a base, a work support and a laterally flexible band saw each carried by said base, guides carried by said base for restraining a portion of said saw to a predetermined path adjacent said work support, a rotary spool carried by said base, said saw having an end portion detachably fixed with said spool, power means for simultaneously rotating said spool and moving it axially, and reversing means simultaneously operative to reverse both the rotary and axial movement of said spool.

7. In a sawing machine, the combination of a base, a work support and a laterally flexible band saw each carried by said base, guides carried by said base for restraining a portion of said saw to a predetermined path adjacent said work support, a rotary spool carried by said base, said saw having an end portion fixed with said spool, means for rotating said spool to wind the saw thereon, and means to space the adjacent turns of said saw axially apart on said spool as the winding progresses.

8. In a sawing machine, the combination of a base, a work support and a laterally flexible band saw each carried by said base, guides carried by said base for restraining a portion of said saw to a predetermined path adjacent said work support, a rotary spool carried by said base, said saw having an end portion fixed with said spool, means for rotating said spool whereby to wind the saw on the periphery thereof, and means to space the adjacent turns of said saw substantially equally axially of said spool as the winding progresses.

9. In a sawing machine, the combination of a base, a work support and a laterally flexible band saw each carried by said base, guides carried by said base for restraining a portion of said saw to a predetermined path adjacent said work support, a rotary spool carried by said base, a major portion of said saw being helically disposed on the periphery of said spool, said saw providing a loop portion between two adjacent helix portions and extended to pass through said guides to provide said saw portion adjacent said work support.

10. In a sawing machine, the combination of a base, a work support and a laterally flexible band saw each carried by said base, guides carried by said base for restraining a portion of said saw to a predetermined path adjacent said work support, a rotary spool carried by said base, a major portion of said saw being helically disposed on the periphery of said spool, said saw providing a loop portion between two adjacent helix portions and extended to pass through said guides to provide said saw portion adjacent said work support, and power means for rotation of said spool including reversing means operative for alternatively actuating said spool in either direction.

11. In a sawing machine, the combination of a base, a work support and a laterally flexible band saw each carried by said base, guides carried by said base for restraining a portion of said saw to a predetermined path adjacent said work support, a rotary spool carried by said base, a major portion of said saw being helically disposed on the periphery of said spool, said saw providing a loop portion between two adjacent helix portions and extending to pass through said guides to provide said saw portion adjacent said work support, transmission mechanism for rotation of said spool and control mechanism for said transmission including a spool reversing device.

12. In a sawing machine, the combination of a base, a work support and a laterally flexible band saw each carried by said base, guides carried by said base for restraining a portion of said saw to a predetermined path adjacent said work support, a rotary spool carried by said base, a major portion of said saw being helically disposed on the periphery of said spool, said saw providing a loop portion between two adjacent helix portions and extended to pass through said guides to provide said saw portion adjacent said work support, and means for simultaneous rotation and axial movement of said spool, whereby said loop may be maintained in a given plane substantially perpendicular to the axis of said spool.

13. In a sawing machine, the combination of a base, a work support and a laterally flexible band saw each carried by said base, guides carried by said base for restraining a portion of said saw to a predetermined path adjacent said work support, a rotary spool carried by said base, a major portion of said saw being helically disposed on the periphery of said spool, said saw providing a loop portion between two adjacent helix portions and extended to pass through said guides to provide said saw portion adjacent said work support, power means for rotation of said spool, and means for axial movement of said spool at a predetermined rate relative to the rotation thereof.

14. In a sawing machine, the combination of a base, a work support and a laterally flexible band saw each carried by said base, guides carried by said base for restraining a portion of said saw to a predetermined path adjacent said work support, a rotary spool carried by said base, a major portion of said saw being helically disposed on the periphery of said spool, said saw providing a loop portion between two adjacent helix portions and extended to pass through said guides to provide said saw portion adjacent said work support, power means for rotation of said spool, means for simultaneous movement of said spool in a predetermined axial direction relative to the rotation thereof, and means for simultaneous reversal of the rotary and axial movement of the spool.

15. In a sawing machine, the combination of a base, a work support and a laterally flexible band saw each carried by said base, guides carried by said base for restraining a portion of said saw to a predetermined path adjacent said work support, a rotary spool carried by said base, a major portion of said saw being helically disposed on the periphery of said spool, said saw providing a loop portion between two adjacent helix portions and extended to pass through said guides to provide said saw portion adjacent said work support, and means for adjusting the endwise tension in the portion of said saw embraced in said loop.

16. In a sawing machine, the combination of a base, a work support and a laterally flexible band saw each carried by said base, guides carried by said base for restraining a portion of said saw to a predetermined path adjacent said work support, a rotary spool carried by said base, a major portion of said saw being helically disposed on the periphery of said spool, said saw providing a loop portion between two adjacent helix portions and extended to pass through said guides to provide said saw portion adjacent said work support, means for detachably fixing one end of said saw with said spool, means for establishing an endwise tension in the portion of the saw embraced in said loop, and means for relieving said endwise tension to permit of the operation of said means for detachably fixing the end of said saw.

BENJAMIN GROB.